UNITED STATES PATENT OFFICE.

ROBERT OXLAND, OF PLYMOUTH, COUNTY OF DEVON, AND CHARLES OXLAND, OF SYDENHAM, COUNTY OF SURREY, ENGLAND.

TREATMENT OF ORES AND MATERIALS CONTAINING SULPHUR FOR THE EXTRACTION OF METALS AND OTHER CONSTITUENTS.

SPECIFICATION forming part of Letters Patent No. 381,809, dated April 24, 1888.

Application filed June 15, 1886. Serial No. 205,242. (No specimens.)

*To all whom it may concern:*

Be it known that we, ROBERT OXLAND, of 32 Portland Square, Plymouth, in the county of Devon, England, consulting chemist, and CHARLES OXLAND, of Greystoke, Crystal Palace Park Road, Sydenham, in the county of Surrey, England, mining engineer, subjects of the Queen of Great Britain, have invented certain new and useful Improvements in Process of Separating Copper from Ores and Materials Containing Sulphur; and we do hereby declare that the following is a full, clear, and exact description of the invention, which will enable others skilled in the art to which it appertains to make and use the same.

For this purpose we take raw or unburned ores containing sulphur—such as the Spanish ores which contain sulphur, iron, copper, silver, and gold—after being ground to fine powder. We digest the same in strong sulphuric acid mixed with solution of persulphate of iron for a sufficient length of time with heat in suitable vessels of cast-iron or of lead, or of fire-brick or stoneware, until all the copper is taken into solution, which may be ascertained from time to time by examination and testing of the ore under operation.

We employ by preference sulphuric acid of a specific gravity of 1.84. Weaker acid may be used; but then the process will be delayed and the concentration of the acid will take place during the process. We employ such a quantity of acid mixed with persulphate of iron, as hereinafter described, as is necessary to reduce the mass of finely-powdered ore to the consistency of treacle or of a fluid paste. The vessels in which the process is carried on (cast-iron vessels serve the purpose well) should be closed and connected with a sulphuric-acid chamber, preferably a chamber in which the manufacture of acid is also carried on in the usual manner. The vapors of sulphurous and sulphuric acid generated in the process pass into the chamber and are utilized. The heat should be raised to about 600° Fahrenheit. In about half an hour the operation will usually be complete. The charge is then, while still semi-fluid, removed from the digester to a tank, where the whole of the soluble matter is separated from the remainder of the ore by treatment with water, preferably in the manner known to chemists as "methodical washing," and a solution of high specific gravity is obtained, while at the same time a complete or practically complete separation of the soluble from the insoluble matter is effected. If the operation be properly conducted, the whole of the copper may in this manner be separated without acting on more than one and one-half or two per cent. of the iron pyrites. The solution obtained, after being filtered or allowed to settle until bright and clear, must then be treated in suitable well-known way, as with a soluble iodide, so as to cause the precipitation of the silver and the gold.

Iodide of sodium may conveniently be employed. It should be added in quantity very slightly in excess of the equivalent of the gold and silver present. After these metals are separated by filtration or settlement, the solution is then removed to another tank, where the copper is precipitated by boiling or metallic iron or by any other suitable process—as, for example, precipitation by sulphide of sodium. After the separation of the copper, silver, and gold, the remaining persulphate of iron may be concentrated to the crystallizing-point, and the saturated solution thus obtained may be employed either for the manufacture of persulphate of iron, copperas, or green vitriol, or may be used with the addition of sufficient fresh acid for the treatment of ores. The final residue of iron pyrites free from copper is obtained in a form suitable for use by sulphuric-acid manufacturers.

In the treatment of a fresh charge of ore the sulphate of iron from a previous charge may, as above stated, be employed; and this we prefer. We take the quantity of sulphuric acid required for the charge—say three times the weight of the copper in the ore—and we add to it persulphate of iron in saturated solution, in quantity such that when the mixture with the ore is made the mass shall have the requisite semi-fluid consistency. We then proceed in the manner already described.

We are aware that roasted sulphuret copper ore has been treated with sulphuric acid, and the copper in such ore (being no longer combined with sulphur) is readily dissolved, either with or without the aid of heat. We are also aware that raw ores in which copper is contained otherwise than in combination with sulphur (as, for example, as oxide) have been treated with sulphuric acid. We are also aware that persulphate of iron, together with sulphuric acid, has been employed in the treatment of burned ores in which the copper is no longer combined with sulphur; but sulphuric acid and persulphate of iron, whether employed singly or together, will not operate effectually to bring into a soluble state copper which is combined with sulphur, as in raw sulphuret ores, unless the method of treatment be such as we have described—that is to say, unless the finely-pulverized ore mixed with the acid and acid salt be exposed to so high a heat as to cause sulphurous-acid vapor to be evolved.

We claim—

1. The method of treating raw or unburned sulphuret ores of copper and iron to render the copper soluble in water, while leaving the iron for the most part insoluble, consisting in mixing the finely-pulverized ore to a semi-fluid consistency with sulphuric acid and a solution of persulphate of iron, and heating the mixture to a temperature such as to evolve sulphurous-acid vapor, substantially as described.

2. The method of treating raw or unburned sulphuret ores of copper and iron to render the copper soluble in water, while leaving the iron for the most part insoluble and rendering the sulphur in the ore available for the manufacture of sulphuric acid, consisting in mixing the finely-pulverized ore to a semi-fluid consistency with sulphuric acid and solution of persulphate of iron, heating the mixture to a temperature such as to evolve sulphurous-acid vapor, and collecting and condensing such acid vapor, substantially as described.

ROBERT OXLAND.
CHARLES OXLAND.

Witnesses:
ARTHUR R. SKERTEN,
GEO. J. B. FRANKLIN,
*Both of* 17 *Gracechurch Street, London, E. C.*